June 17, 1969  E. STREISINGER  3,450,466
EYE MOVEMENT RECORDER
Filed Feb. 19, 1965  Sheet 2 of 2

INVENTOR
ERWIN STREISINGER

Schulze, Blair & Benoit
ATTORNEYS

United States Patent Office 3,450,466
Patented June 17, 1969

3,450,466
EYE MOVEMENT RECORDER
Erwin Streisinger, Reading, Pa., assignor, by mesne assignments, to United States Testing Company, Inc., Hoboken, N.J., a corporation of New York
Filed Feb. 19, 1965, Ser. No. 434,073
Int. Cl. A61b 3/14, 3/00
U.S. Cl. 351—7        5 Claims

ABSTRACT OF THE DISCLOSURE

Apparatus for the detection and recording of eye movements of a subject under examination. A signal is generated which projects a focused beam of light upon the eye in such a manner that the beam encompasses two, differently reflecting surfaces, such as the pupil and iris. The scan is made in a circular manner and any deviation in intensity of the reflected beam can be translated into eye movements and direction.

---

The invention relates generally to an eye movement recorder and more specifically to a device for detecting and measuring the movement of a subject's eyes.

There are, at the present time, several types of devices used for measuring and recording the movement of the eye for various purposes, such as clinical diagnosis and the like. One such device localizes a light beam reflected onto and back from the cornea of the eye. Such a reflected light beam is incapable of maintaining adequate focus, partly because the cornea which is used as a reflecting surface is optically imperfect, and partly because the radius of the corneal surface is offset relative to the radius of rotation of the eye. This latter condition necessarily causes distortion, not only because the reflecting surface becomes an off-axis element, but also because the reflected light subtends approximately twice the angle of the angular rotaton of the eye. The register error in such a system, assuming a twenty degree (total) spherical angle of eye deflection, is in excess of ten percent.

Optical corrections for these distortions can be made. However, such corrections would be extremely elaborate and costly. Without such correction, the usefulness of the instrument is severely curtailed, since it does not, in fact, superimpose the reflected spot of light on the reflected image on the scene being used except for a very small angular deflection of the eye.

Mechanical scanners have also been used for clinical diagnosis such as determining pupil changes. However, this mechanical type of scanner cannot be made to resolve the fastest known movements of the eye. Therefore, the value of these devices is extremely limited for close clinical analysis of eye movements.

Accordingly, it is an object of this invention to provide an eye movement detecting and measuring device which records high resolution analog data on the movement of a person's eyes in terms of position and time sequence. Further specific objects of this invention are to obtain data containing information regarding the following factors:

(1) Eye position;
(2) Sequence of eye positions;
(3) Duration of stationary periods;
(4) Speed and rates of change of movement of the eyes; and
(5) Differences in the activities of the two eyes.

Yet another object of the invention is to obtain the above data in a form which may be recorded for later visual presentation for use in digital form for computer analysis.

Broadly speaking, the present invention comprises a pair of cathode ray tubes controlled by a signal generator which provides a repetitive scanning spot, these spots being projected by standard optical means onto a subject's eyes and reflected back from the surface thereof onto further projection optics and subsequently onto photo multiplier tubes which measure the varying intensities of the reflected light. Since the scan is controlled in relationship to the iris and sclera of the eye, the reflected light spot will vary in intensity depending upon its relative position on the overall eye surface. The output of the photo multiplier tubes is supplied to standard electronic devices for detecting not only the maximum intensity of the output, but the point in time at which such intensity occurs. This output is compared in phase and intensity with the output of a reference signal generator which is synchronized with the signal generator controlling the cathode ray tubes. Thus, a continuous reading may be either supplied to a device such as an oscilloscope or recorded on magnetic tape for later viewing or analysis which contains the continuous story of the patient's eye movements.

The invention will be more clearly understood from the following description when taken with the illustrative drawings wherein.

Figure 1:
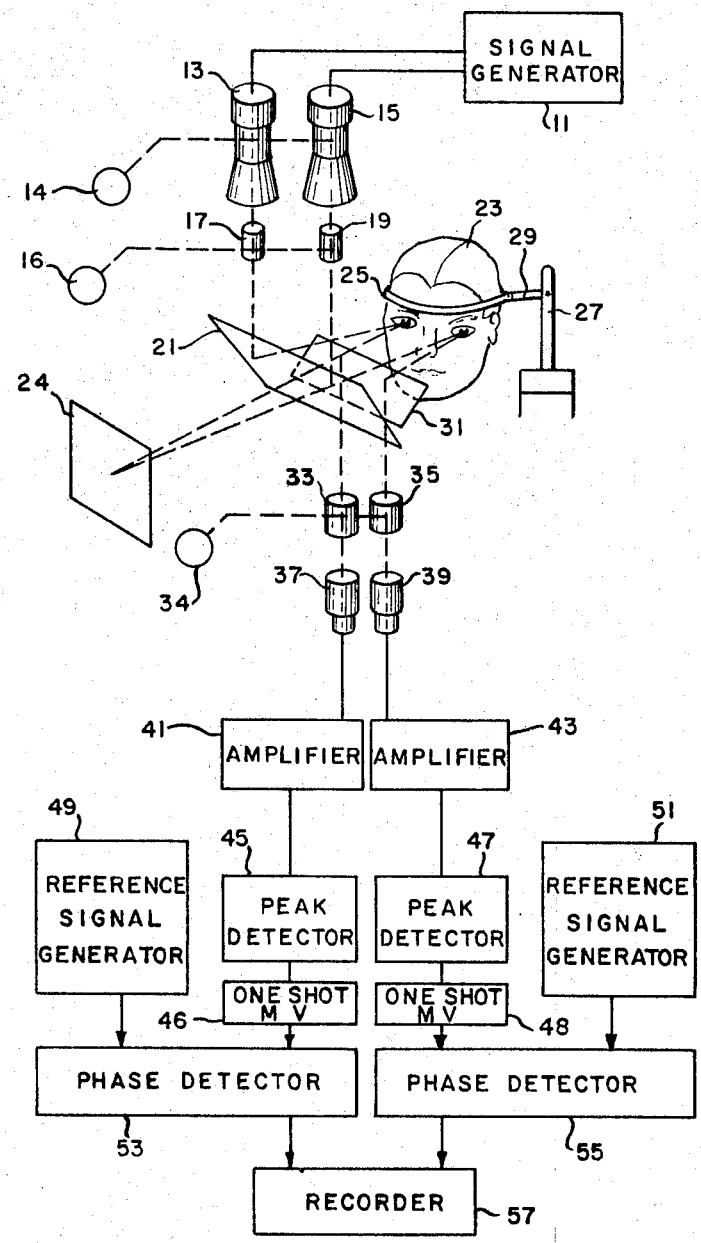
FIG. 1 is a schematic drawing of the system optics and electronics.

Turning now more specifically to the drawings:

FIG. 1 is a schematic illustration of a preferred embodiment of the invention. The various optical and electronic components are of standard type and available commercially and are, therefore, only shown in their box or schematic form.

A signal generator 11 controls the scanning beam of the cathode ray tubes 13 and 15 so as to provide a repetitive constant frequency scanning spot on the face of each tube. These scans are picked up and projected by a scanning optical system 17 and 19. Since the scan of etch tube is related to a separate eye of the patient, there is shown a manual adjustment means 14 for the cathode ray tubes and a manual adjustment means 16 for the optical projection means 17 and 19 so that they can be adjusted to conform to the particular patient under study.

The scanning beams are projected onto a beam splitter mirror 21 into the eyes of the subject 23. Again, it is well known that the subject's head must be maintained in a stable and firmly fixed attitude and there is shown a schematic means including a vertical bar 27 connected to a cross member 29 and a strap 25 for holding the subject's head completely still.

The subject concentrates on the the viewing area 24 through the beam splitting mirrors and the light is reflected from the eye surface onto beam splitter mirror 31 and into a further set of projection optics 33 and 35 which may also be adjustable by a manual means such as knob 34. Projection optics 33 and 35 direct the light beams onto photomultiplier tubes 37 and 39. As is well known, these photomultiplier tubes are light sensitive elements having an amplitude dependent upon the intensity of the light directed thereupon.

The outputs of the photomultiplier tubes 37 and 39 are supplied to a pair of amplifiers 41 and 43 and thus, to a pair of peak detectors 45 and 47 which in turn trigger pulsing devices such as one shot multivibrators 46 and 48 to provide a pulse output just as the intensity begins to decrease from a maximum.

Reference signal generators 49 and 51 are coordinated with signal generator 11 so as to put out a pulse of predetermined standard amplitude as a fixed repetitive frequency in synchronization with the scanning spot provided by the cathode ray tubes 13 and 15.

The outputs of the reference signal generators and the one shot multivibrators are supplied to phase detectors 53 and 55 which supply output pulses as triggered by the reference signal generator 51 and output pulses responsive to the outputs of the one shot multivibrators.

The outputs of the phase detectors may be connected directly to a viewing device such as an oscilloscope or, as shown in FIG. 1, may be recorded for further viewing or analysis.

FIGS. 2 through 6 and 7 through 11 indicate two different methods of scanning the subject's eye and further specifically illustrate the manner in which the present invention is practiced.

Figure 2:
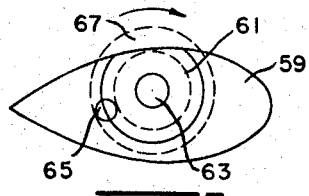
FIGS. 2–6 are illustrative of one type of light scan with graphic outputs.
Figure 4:
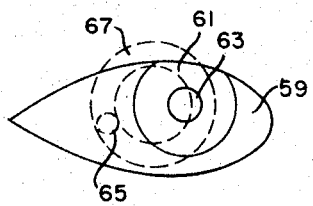

FIGS. 2 and 4 represent a subject's eye having a sclera 59, an iris 61, and a pupil 63. The scanning beam 65 is directed by means of the projection optics and split screen beam splitter mirror onto the subject's eye, with the first illustration being a circular scan. This scan is a substantially round spot of light which describes a circular path such that its diameter follows the outside diameter of the subject's iris 61. In this manner the spot of light 65 is bisected by the iris and the outlining sclera with the coincidence of the path of travel of the spot and the diameter of the iris being maintained only while the subject's eye is directed toward the exact center of the stimulus of viewing area 24. This is the situation as illustrated in FIG. 2.

Figure 3:
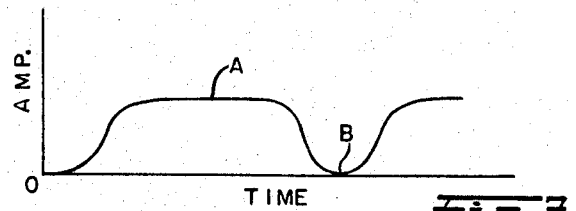

FIG. 3 is a graphic illustration of the curve output of the multiplier tubes when the subject's eye is in the position of FIG. 2. In this case the maximum amplitude A is maintained except when the light passes across the eyelid 67 wherein the amplitude drops substantially to zero as shown at B.

FIG. 4 illustrates the subject's eye when the viewing direction has been changed so that the scanning spot 65 covers more of the iris along one section of the path and more of the sclera on the opposite section of its path.

Figure 5:
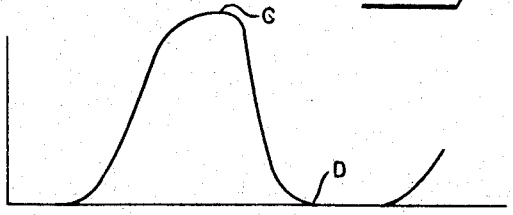

FIG. 5 illustrates the time-amplitude graph of the output of the photomultiplier tubes when the eye is in the position as shown in FIG. 4. It will be evident with the scanning spot 65 in the position shown in FIG. 4, a maximum amount of reflection will be obtained since the entire spot is directed at the sclera of the eye. This maximum is illustrated at G with the reflection following substantially to zero when the scanning spot is completely directed at the iris as indicated at D.

Figure 6:
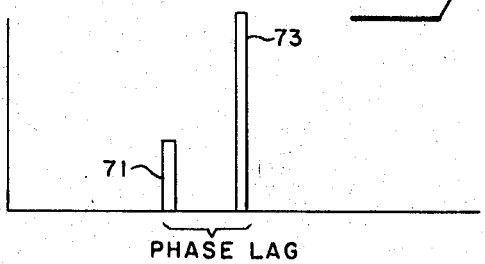

FIG. 6 illustrates the final pulsed output of the phase detector 53 or 55 of FIG. 1. Pulse 71 is of the fixed frequency according to the outputs of the reference signal generators 49 and 51, thus having a fixed amplitude and frequency of the input to the recorder or detecting device. The amplitude of the pulse 73 is determined by the peak detector and the occurrence in time of such a pulse may be detected in a standard manner such as triggering a one shot multivibrator which is set to produce the pulse when the positive going upward signal begins to go negative at the downward elbow portion of the curve C. This establishes a pulse which is offset relative to the reference pulse 71 with its height being a function of the height of the position signal and its position timewise being an indication of phase difference or lag between the reference signal 71 and the pulse signal 73. Thus, it will be seen that for every eye position including the zero or straight ahead position of FIG. 2 there is a unique combination of reference signal and varying output signal pulses which are identifiable in an oscilloscope arrangement or in a computer device taking the recorded data.

Figure 7:
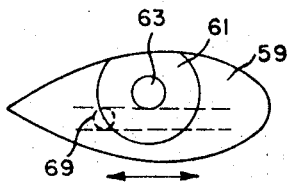
FIGS. 7–11 are illustrative of a further type of light scan and graphic outputs.
Figure 8:
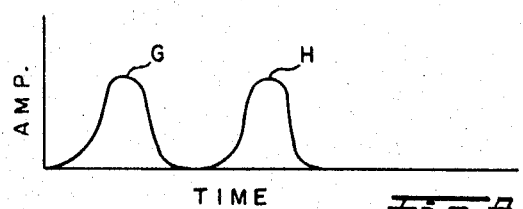

FIGS. 6 through 11 illustrate much the same type of operation as that discussed above with the exception that the scan of the spot here designated 69 is linear rather than circular. The spot is adjusted by the adjusting means illustrated in FIG. 1 so that the outer edge of the iris bisects the scanning spot 69 at each end of its ultimate scan when the eye is in the zero or direct viewing position as shown in FIG. 7. FIG. 8 shows a graphic illustration of the amplitude-versus-time projection of the output of the photomultiplier tubes when the eye is in the position of FIG. 7. A peak amplitude G will occur when the scanning spot 69 is in the position shown in FIG. 7 and a substantially identical peak amplitude H will occur when the scanning spot reaches the opposite side of the iris 61.

Figure 9:
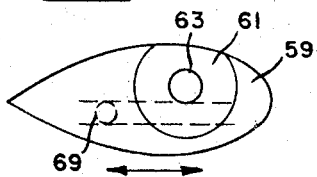
Figure 10:
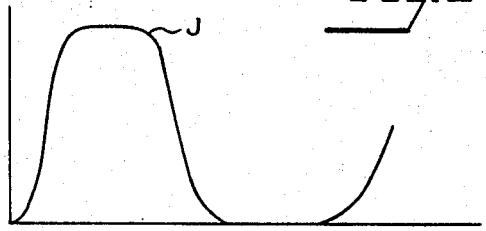
Figure 11:
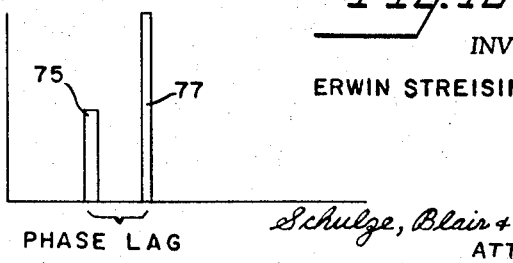

FIG. 9 shows the eye with the viewing position changed, and FIG. 10 again shows a graphic representation of the output of the photomultiplier tube. With the spot or the scan spot 69 in the position shown in FIG. 9, a maximum amplitude will be obtained as illustrated in the graphic representation since the total scanning spot is directed at the sclera of the eye. Again the point J at which the signal begins to go negative triggers the one shot multivibrator and produces the pulse 77 shown in FIG. 11. The pulse 75 is produced in the same manner as FIG. 6 by the reference signal generators 49 and 51 of FIG. 1.

The present invention employs a single scan path, such as the circular and linear paths described for each time increment during which information is required. This single sweep yields all of the information necessary to determine eye position, and duration of any fixation and movement as well as rate of motion. While it is possible to convert the signal to visually meaningful pictorial presentation, such signals are also useable for recording on a variety of media and may thus be used directly by computing devices for analysis.

It is to be understood that the various components are illustrative of one form of the invention, and well-known optical and electronic components may be substituted therefore without departing from the scope of the invention.

I claim:
1. A device for detecting and measuring the movement of a subject's eye comprising:
   a cathode ray tube,
   a first signal generator for generating a scanning light beam with said cathode ray tube,
   adjustable projection optics for projecting said scanning light beam onto said eye surface,
   a photomultiplier tube,
   optical means for receiving and projecting the light reflected from said eye surface to said photomultiplier tube,
   an amplifier coupled to the output of said photomultiplier tube,
   a detector circuit coupled to the output of said amplifier for determining maximum signal amplitude,
   a reference signal generator having a pulse output synchronized with said first signal generator,
   detecting means coupled to the outputs of said detector circuit and said reference signal generator for determining the relative phase difference between the reference pulse and the signal output of the detector circuit, and
   means for observing output of said detecting means.

2. The device of claim 1 wherein said first signal generator generates a substantially circular repetitive scan and said adjustable projection optics projects said circular scan so that the diameter of the circular scan is substantially the same as the diameter of the iris of said eye.

3. A device for detecting and measuring the movement of a subject's eyes comprising:
   a pair of adjacent cathode ray tubes having their major axes substantially parallel,
   a first signal genertor for generating substantially simultaneous scanning light beams with said cathode ray tubes,
   adjustable projection optics for projecting said light beams onto the surface of said eyes, each of said pair of cathode ray tubes being associated with a separate one of said eyes, a pair of photo-transducer means responsive to the light reflected from each of said eyes, said transducer means having an output proportional to the intensity of said reflected light, means for detecting the maximum output of said transducer means, a pair of reference signal generators having a pulse output synchronized with said first signal generator, a pair of detecting means, one of said detecting means being coupled to one of said reference signal generators and one of said photo-transducing means, the other of said detecting means being coupled to the other of said reference signal generators and the other of said photo-transducers, and means for observing output of said detecting means.

4. A device for detecting and measuring the movement of a subject's eye comprising, a cathode ray tube for generating a repetitive scanning light beam, optical means for projecting said scanning light beam onto said eye surface, light sensitive signal generating means responsive to light reflected from said eye surface, a reference signal generator having a pulsed signal output synchronized with the repetitive scanning light beam of said cathode ray tube so as to provide a reference pulse relative to said scanning beam, means for detecting the maximum amplitude of the output of said light sensitive signal generating means for providing a signal pulse indicative of the time of occurrence of said maximum, and means coupled to the output of said reference signal generator and to said means for detecting the output of said light means for comparing the relative time of occurrence of said signal and reference pulses.

5. A method for observing the movement of a subject's eye comprising the steps of generating a focused beam of light, projecting said beam as a spot onto the eye, repetitively deflecting said beam and causing the center of said spot to traverse a circular scanning path having a diameter substantially equal to the diameter of the circular boundary between two portions of the eye having different coefficients of reflectivity for incident light whereby the intensity of reflected light from the eye remains substantially contsant during a trace whenever the center of the pupil of the eye coincides with the center of said scanning path, observing the intensity of the reflected light and determining when in point of time it reaches a maximum amplitude relative to the time of initiation of said trace, thereby determining the direction and extent of movement of said eye from said coinciding position.

References Cited

UNITED STATES PATENTS 2,445,787    7/1948    Lilienfeld _____ 351—7
2,964,644   12/1960    Hobrough.

OTHER REFERENCES

Rashbass: "New Method for Recording Eye Movements," Journal of The Optical Society of America, vol. 50, No. 7, July 1960, pp. 642–644.

DAVID SCHONBERG, *Primary Examiner.*

P. A. SACHER, *Assistant Examiner.*

U.S. Cl. X.R.

351—39